United States Patent [19]

Ferrar

[11] 4,393,707
[45] Jul. 19, 1983

[54] FLUIDIC ANGULAR RATE SENSOR EMPLOYING IONIZED GAS

[75] Inventor: Carl M. Ferrar, East Hartford, Conn.

[73] Assignee: United Technologies Corporation, Hartford, Conn.

[21] Appl. No.: 308,321

[22] Filed: Oct. 2, 1981

[51] Int. Cl.³ .............................................. G01P 15/08
[52] U.S. Cl. .................................. 73/505; 73/516 LM
[58] Field of Search ......... 73/516 R, 516 LM, 517 R, 73/517 A, 505

[56] References Cited

U.S. PATENT DOCUMENTS

| 3,106,678 | 10/1963 | Lynn | 73/517 R |
| 3,360,677 | 12/1967 | Stocker et al. | 73/516 LM |
| 3,910,122 | 10/1975 | Evans et al. | 73/516 LM |
| 4,156,364 | 5/1979 | Hill | 73/516 LM |

Primary Examiner—James J. Gill
Attorney, Agent, or Firm—Eric W. Petraske

[57] ABSTRACT

A fluidic angular rate sensor employs an ionized stream of gas 104, the deflection of which is detected by an amplifier 130 connected to a pair of collection electrodes 122 and 124, motive power for the gas stream 104 being provided by momentum transfer from ions in a corona discharge.

2 Claims, 4 Drawing Figures

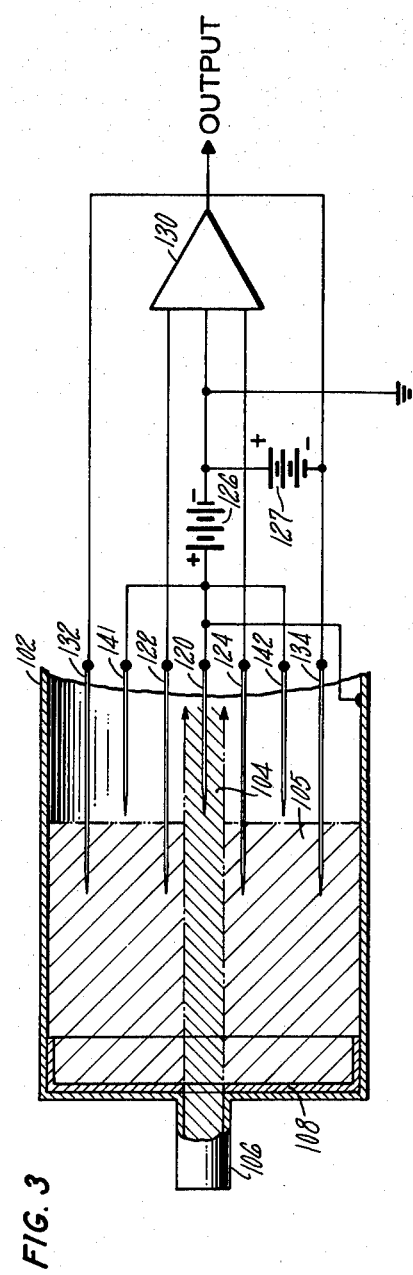
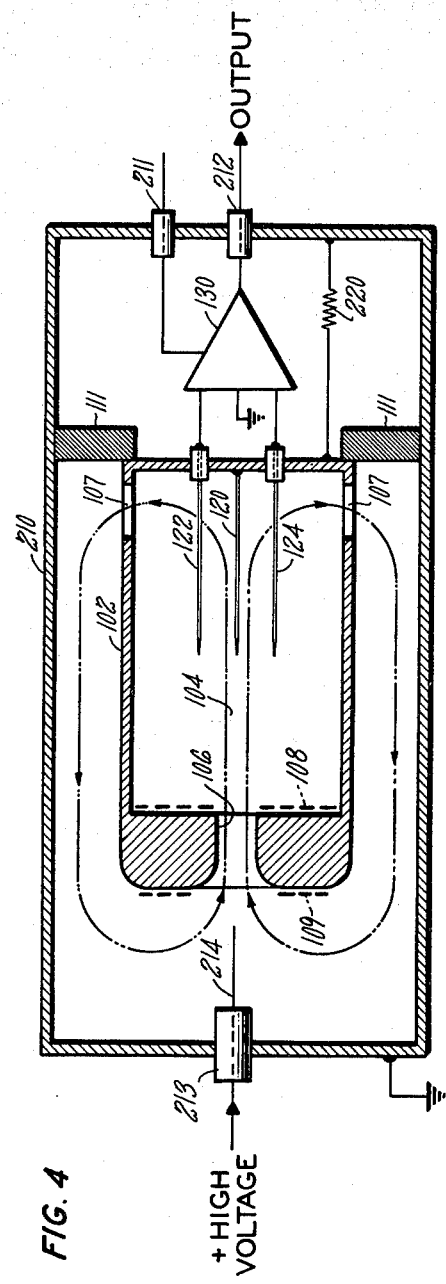
FIG. 3
FIG. 4

FLUIDIC ANGULAR RATE SENSOR EMPLOYING IONIZED GAS

DESCRIPTION

TECHNICAL FIELD

The field of the invention is that of a fluidic angular rate sensor improved by the use of an ionized gas as the working fluid and ion collectors as sensing elements.

BACKGROUND ART

Fluidic angular rate sensors are illustrated in U.S. Pat. Nos. 3,587,328 and 3,626,675, in which a stream of flowing gas is deflected to one side by the effect of the Coriolis force, which in turn depends upon the angular rate of rotation of the device. In the prior art, this deflection was sensed by a matched pair of hot-wire anemometers. One important advantage of this type of angular rate sensor is that the only moving part is the pump used to provide the jet of gas. It is essential in these prior art devices that the thermal effects of the wires be extremely well matched and problem of manufacturing variations within the wire material has long plagued the art.

DISCLOSURE OF INVENTION

The invention relates to an improved fluidic angular rate sensor in which an ionized gas jet flows along an axis, the deflection from that axis being substantially proportional to the angular rate of rotation of the device, this deflection being measured by a pair of ion collecting elements. The invention further relates to the elimination of all moving parts by means of an electric wind source of pressure to move the gas jet.

BRIEF DESCRIPTION OF DRAWINGS

FIG. 3 illustrates an embodiment of the invention employing improved compensation; and FIG. 4 illustrates an embodiment of the invention with no moving parts.

BEST MODE FOR CARRYING OUT THE INVENTION

Figure 1:
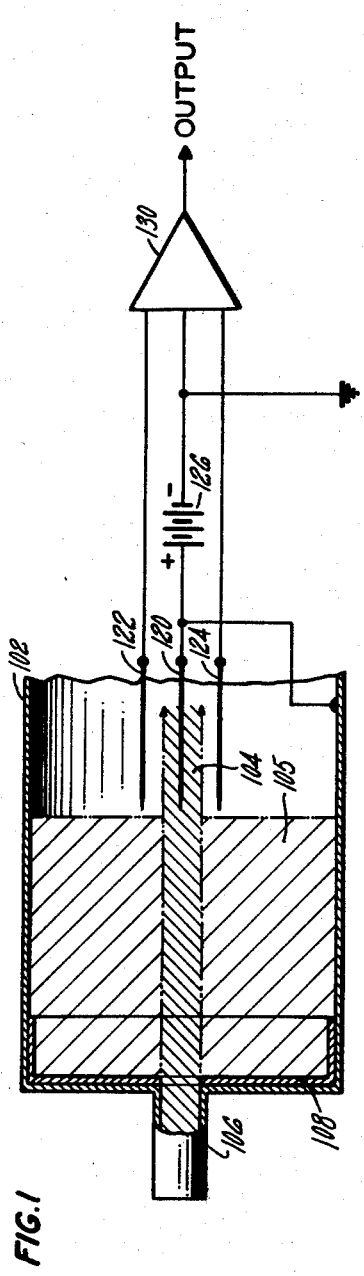
FIG. 1 illustrates a simple embodiment of the invention.

FIG. 1 illustrates a simple embodiment of the invention in which a stream of flowing gas 104 enters enclosure 102 through aperture 106, powered by a pump not shown, proceeds along the axis and is deflected in the plane of the paper by rotation of the device in that same plane. This deflection is caused by the effect of the Coriolis force acting on the flowing molecules in the gas. The result of that deflection will be that a greater flow of gas will pass one electrode of electrodes 122 and 124, than will pass the other electrode of the pair. In the prior art, this difference in flow was detected by measuring the differential cooling of a pair of matched hot-wire anemometers, with problems well known in the art in matching the effects of the wire and in compensating for temperature problems. In this invention, differential flow is measured by a difference in current between electrodes 122 and 124.

In operation, gas 105 is ionized by radioisotope 108 disposed about the left-hand portion of the inside of housing 102. This radioisotope, illustratively americium-241, emits radioactive particles which produce positive and negative ions distributed within a short range of the radioactive compound and extending not only in gas jet 104 but also in the surrounding gas 105. This wide spread of ionization is advantageous in that ions diffusing out of the gas jet are replaced by ions diffusing in from the stationary gas through which the jet passes, thus compensating for any ion loss as the gas jet traverses the apparatus. The combination of positive and negative charges distributed initially uniformly throughout the gas also has the advantageous feature that there is no net electrical repulsion driving ions away from the gas jet.

The deflected gas jet 104 impinges on an electrode array consisting of center electrode 120 biased to a predetermined positive voltage and side ion-collector electrodes 122 and 124 which are spaced apart from electrode 120 by a predetermined transverse distance and are connected directly to the input connectors of amplifier 130. The two collector electrodes will each attract ions on one side of center electrode 120, so the difference in electrode current will depend on the deflection of the gas stream and thus on the rate of angular rotation. Positive ions within the gas stream are deflected away from electrode 120 by the positive bias in voltage and deflected into one or the other of the collector electrodes. Electrode 120 is shown in the drawing as having a positive bias with respect to electrodes, but a negative bias may also be used. The amount of the bias is not critical and may be conveniently set at a high enough value so that essentially all of the ions are collected.

The output of amplifier 130 will, as is well known in the art, be proportional to the difference in magnitude of the two inputs. This output signal will have the same common mode problems that are inherent in the detection of the relatively small difference between two large signals. The problem of common mode rejection is well known to those skilled in the art and the particular amplifier design is not part of the present invention. High quality amplifiers capable of rejecting high common mode currents are well known to those skilled in the art. The amount of the common mode signal may be reduced by adjusting the distance between radioactive material 108 and the collecting electrodes, or by increasing the stopping power of gas 105 to reduce the number of particles that reach the vicinity of the electrodes, since ions generated at or near the electrodes will not be affected by the Coriolis force and will contribute only to the common mode signal.

High quality current amplifiers may be constructed having a sensitivity on the order of $10^{-13}$ amps, which corresponds to an angular rate sensitivity of 0.1 degree/sec. in a fluidic angular rate sensor of conventional configuration. The use of AC rather than DC detection, by reversing the inter-electrode bias, may be used to avoid drift; and temperature compensation may be employed to stabilize the sensor response further if a particular application requires. The signal output at zero rotation may be nulled by a slight bending or repositioning of the collector electrodes.

Figure 2:
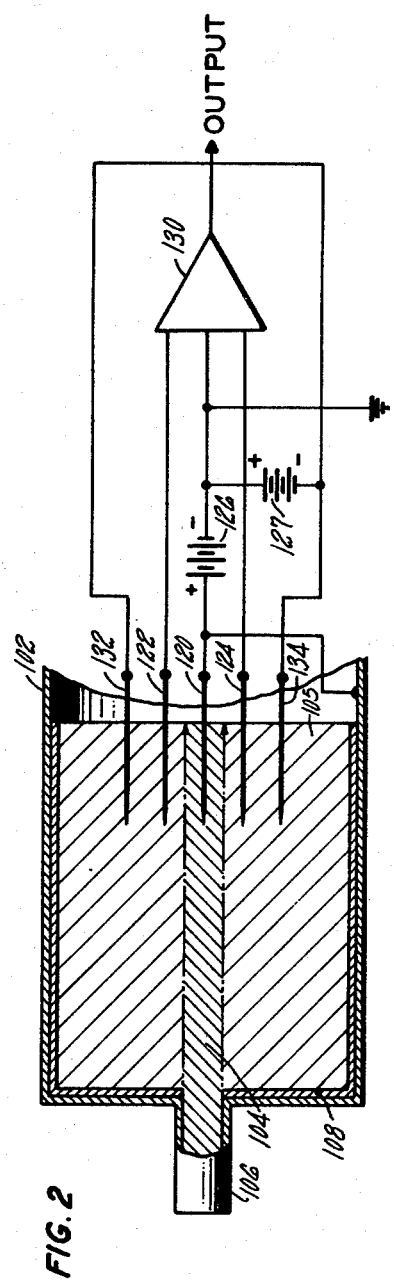
FIG. 2 illustrates an embodiment of the invention with additional compensating electrodes.

An alternative embodiment of the invention, suitable for a situation in which radioisotope 108 is extended over a large portion of the interior of housing 102 (in order to generate a sufficient quantity of ions) is illustrated in FIG. 2, in which additional compensating electrodes 132 and 134 are connected to and biased with respect to the center input of amplifier 130 by voltage source 127, the bias being negative so that electrodes 132 and 134 attract positive ions away from collector electrodes 122 and 124. The purpose of these compensating electrodes is to collect those positive ions generated within gas 105 between the compensating electrodes and the collector electrodes, i.e. those ions which are not part of the flowing gas stream and thus are not responsive to the angular rotation which is being measured. By empirically determining the size, position and bias of the compensating electrodes, the ion current flowing away from the collection electrodes towards the compensating electrodes may be made essentially equal to the current flowing from the center electrode to the ion collecting electrodes. The net current to each collector and thus the common mode signal to the amplifier can thus be effectively canceled out. Initial adjustment of the device with the sensor stationary will result in effective nulling of the common mode signal and thus the signal passing through the amplifier will be nearly all due to the rotation.

FIG. 3 illustrates a further refinement of the invention, in which radioactive source 108 is confined to a small portion of the interior volume of the housing and in which the source is an alpha emitter, a characteristic of which is that the radioactivity and ionization induced by the source is confined to a small area. The ions are thus generated only in the upstream portion of the gas jet so that a maximum fraction of the ions are subject to the Coriolis deflection and so that the fraction of ions generated in the collection region is reduced. The center electrode 120 is connected directly to additional electrodes 141 and 142 which have the purpose of repelling back to the collector electrodes 122 and 124 that portion of the ions which are not collected immediately. Collector electrodes 122 and 124 and compensating electrodes 132 and 134 perform the same functions as in the previous figure, but are extended further upstream in order to reach into the high ionization region of the gas and provide better cancellation of common mode signals.

The preceding figures all show means of collecting ions from a gas jet, the gas jet itself being provided by a conventional pump. The embodiment of the invention illustrated in FIG. 4 illustrates an alternative "pump" employing no moving parts. In this figure, electrode 214 is maintained at a high voltage on the order of several thousand volts by a voltage source not shown, the electrode passing through case 210 through insulator 213. Electrode 214 serves as a source of a corona discharge directed at the lower potential of case 102. Bias resistor 220 connected between case 210 and housing 102 serves to provide the bias formerly provided by supply 126. Separate power supplies could be used for the high voltage and the bias, if desired.

Radioactive source 109 serves as a temporally stable and spatially uniform source of ionization, the magnitude of which is multiplied by the electric field surrounding electrode 214. Ions generated in a corona discharge are accelerated by the electric forces which generate them and thus serve as a small source of motive power to the gas within which the ions move. The pressure provided by such a discharge is extremely small but is sufficient for this particular application, and has the great advantage that the only moving part of the previous embodiments, namely the pump, is eliminated.

Gas jet 104 passes through housing 102 and is detected by electrodes 120, 122 and 124 as before, the gas then exiting through apertures 107 in housing 102 and circulating around again. Amplifier 130 functions as before, being connected through insulating members 211 and 212. The simple electrode configuration of FIG. 1 is illustrated in FIG. 4; other electrode configurations may be added if desired.

The foregoing embodiments of the invention have been illustrated as having pin-shaped electrodes in a single plane. Electrodes having greater surface area may be used, resulting in more efficient ion collection and slightly increased turbulence in the gas. A complementary set of collection (and compensation) electrodes and amplifier may be added perpendicular to the plane of the drawing, thus providing information on rotation about two axes.

I claim:
1. A fluidic angular rate sensor comprising:
   means for generating and directing a gas stream along an axis passing through a quantity of substantially stationary gas;
   means for creating ions over a predetermined region of said gas stream and said stationary gas;
   a center electrode positioned on said axis;
   ion-collecting means comprising at least two ion-collecting electrodes for collecting ions from said gas stream at least two positions displaced symmetrically from said axis by a first predetermined transverse distance in a first plane passing through said axis, to form first and second ion currents;
   a pair of compensating electrodes disposed symmetrically about said axis at a second predetermined transverse distance greater than said first predetermined transverse distance in said first plane, said pair of compensating electrodes being biased with respect to said center electrode by a bias amount such that ions are attracted from the vicinity of said ion-collecting electrodes toward said compensating electrodes, the amount of said bias being such that ion flow from said ion-collecting electrodes to said compensating electrodes is substantially equal to ion flow from said center electrode to said ion-collecting electrodes, whereby current flow common to both said ion currents is reduced;
   means for combining said first and second ion currents to form a signal representative of the difference between said ion currents.

2. A fluidic angular rate sensor according to claim 1, further comprising a pair of retarding electrodes, disposed intermediate said pair of collecting electrodes and said pair of compensating electrodes and having substantially the same electrical potential as said center electrode; in which sensor said collecting electrodes extend along a first portion of said axis having a first ion-source end disposed toward said means for creating ions and said reflecting electrodes extend along a second portion of said axis having a second ion-source end, which second ion source end is further along said axis from said ion source than said first ion-source end, whereby ions passing said first ion-source end are reflected back toward said first ion-source end by said reflecting electrodes.

* * * * *